United States Patent
Sawai et al.

(10) Patent No.: US 9,496,583 B2
(45) Date of Patent: Nov. 15, 2016

(54) LITHIUM SECONDARY BATTERY, METHOD FOR PRODUCING POWER COLLECTION FOIL FOR SAME, AND POWER COLLECTION FOIL FOR SAME

(75) Inventors: Takehiko Sawai, Mie (JP); Shinji Saito, Mie (JP); Kazunori Urao, Mie (JP)

(73) Assignee: SEI CORPORATION, Mie (JP)

(*) Notice: Subject to any disclaimer, the term of this patent is extended or adjusted under 35 U.S.C. 154(b) by 233 days.

(21) Appl. No.: 13/503,629

(22) PCT Filed: Oct. 21, 2010

(86) PCT No.: PCT/JP2010/068544
§ 371 (c)(1),
(2), (4) Date: Apr. 23, 2012

(87) PCT Pub. No.: WO2011/049153
PCT Pub. Date: Apr. 28, 2011

(65) Prior Publication Data
US 2012/0210548 A1   Aug. 23, 2012

(30) Foreign Application Priority Data
Oct. 23, 2009   (JP) .................. 2009-244054

(51) Int. Cl.
*H01M 4/70*   (2006.01)
*H01M 10/04*   (2006.01)
(Continued)

(52) U.S. Cl.
CPC ......... *H01M 10/052* (2013.01); *H01M 4/0404* (2013.01); *H01M 4/139* (2013.01);
(Continued)

(58) Field of Classification Search
CPC ............... H01M 4/742; H01M 10/052; H01M 4/0404; H01M 4/139; H01M 4/661;
(Continued)

(56) References Cited

U.S. PATENT DOCUMENTS 6,265,099 B1 * 7/2001 Gauthier et al. ............. 429/162
6,444,366 B1   9/2002 Kawano
(Continued)

FOREIGN PATENT DOCUMENTS

EP   0926752 A1   6/1999
EP   0964465 A1   12/1999
(Continued)

OTHER PUBLICATIONS

English Translation of Foreign Docunment JP 2004-234909 A: Fukunaga et al., Electrode for electrochemical element and battery using same.*
(Continued)

*Primary Examiner* — Nicholas P D'Aniello
*Assistant Examiner* — Philip A Stuckey
(74) *Attorney, Agent, or Firm* — Hedman & Costigan, P.C.; James V. Costigan; Kathleen A. Costigan

(57) ABSTRACT

The present invention provides a method for producing a lithium secondary battery in which peeling of an active substance can be prevented and the generation of metal powder can be prevented when a power collection foil is processed at an electrode production step. The method for producing the lithium secondary battery includes an electrode-producing step of producing a positive electrode and a negative electrode; a step of forming a group of electrodes by layering the positive electrode and the negative electrode on each other through a separator, or winding the positive electrode and the negative electrode through a separator; and a step of immersing the group of the electrodes in an (Continued)

electrolyte. The electrode-producing step has a boring step of forming a plurality of through-holes penetrating a power collection foil and having projected parts projected from at least a rear surface of the power collection foil.

5 Claims, 7 Drawing Sheets

(51) Int. Cl.
*H01M 10/052* (2010.01)
*H01M 4/04* (2006.01)
*H01M 4/139* (2010.01)
*H01M 4/74* (2006.01)
*H01M 10/0566* (2010.01)
*H01M 10/0585* (2010.01)
*H01M 10/0587* (2010.01)
*H01M 4/66* (2006.01)

(52) U.S. Cl.
CPC ............... *H01M 4/74* (2013.01); *H01M 4/742* (2013.01); *H01M 10/0431* (2013.01); *H01M 10/0566* (2013.01); *H01M 10/0585* (2013.01); *H01M 10/0587* (2013.01); *H01M 4/661* (2013.01); *Y02E 60/122* (2013.01); *Y02P 70/54* (2015.11); *Y10T 29/302* (2015.01)

(58) Field of Classification Search
CPC .................... H01M 4/74; H01M 4/472; H01M 10/0566; H01M 10/0585–10/0587; H01M 10/0431; Y10T 29/302; Y02E 60/122; Y02P 70/54

USPC ........................................................ 429/120
See application file for complete search history.

(56) References Cited

U.S. PATENT DOCUMENTS

| 6,455,201 B1 | 9/2002 | Sugikawa | |
| 6,500,582 B1* | 12/2002 | Sugikawa | 429/217 |
| 6,605,388 B1 | 8/2003 | Goda | |
| 2004/0026239 A1* | 2/2004 | Kishimi et al. | 204/288 |
| 2007/0193009 A1* | 8/2007 | Vincze et al. | 29/2 |
| 2010/0027193 A1* | 2/2010 | Marumo et al. | 361/505 |

FOREIGN PATENT DOCUMENTS

| JP | 08-096806 A | | 4/1996 | |
| JP | 09-289021 A | | 11/1997 | |
| JP | 10-106580 A | | 4/1998 | |
| JP | 11-185763 A | | 7/1999 | |
| JP | 11-260375 A | | 9/1999 | |
| JP | 2001-357856 A | | 12/2001 | |
| JP | 2004-079500 A | | 3/2004 | |
| JP | 2004-234909 A | | 8/2004 | |
| JP | 2004234909 A | * | 8/2004 | ............. H01M 4/02 |
| JP | 2004-342519 A | | 12/2004 | |
| JP | 2008-004281 A | | 1/2008 | |
| JP | 2008-311171 A | | 12/2008 | |

OTHER PUBLICATIONS

English Translation of JP 2004234909 A.*

* cited by examiner

LITHIUM SECONDARY BATTERY, METHOD FOR PRODUCING POWER COLLECTION FOIL FOR SAME, AND POWER COLLECTION FOIL FOR SAME

TECHNICAL FIELD

The present invention relates to a lithium secondary battery, a production method for producing a power collection foil for the lithium secondary battery, and the power collection foil for the lithium secondary battery produced by the production method.

BACKGROUND ART

A lithium-ion secondary battery in which a negative electrode is formed by using a material capable of absorbing and discharging lithium ions is capable of restraining deposit of dendrite to a higher extent than a lithium battery in which the negative electrode is formed by using metallic lithium. Therefore the former battery has an advantage of capable of preventing the occurrence of a short circuit and has enhanced safety.

In recent years, the lithium secondary battery is demanded to have a high capacity and is charged and discharged at high current to use it for equipment which is operated at a high power. Thereby metal lithium may deposit on the negative electrode, and an internal short circuit may occur. In the worst case, there is a fear that heat is generated and an ignition accident occurs.

Owing to a demanded high capacity of a positive electrode material containing a lithium metal oxide or a negative electrode material containing a carbon-based material, devices are conventionally proposed to allow absorbing and discharging reactions to be sufficiently accomplished at the negative electrode to prevent metal lithium from depositing on the negative electrode. In addition devices are proposed to increase specific surface areas of electrodes by decreasing the diameters of particles of an active substance. Further the electrodes are so designed as to increase the areas thereof. Although these devices progresses the designing of the electrode in a safe direction, measures against the occurrence of a short circuit caused by the drop and peeling of the active substance in the production of a battery are insufficient. Therefore devices for improving the power collection foil are proposed. For example, the following power collection materials are known: the power collection material which is reticulate, consists of the hole-formed punching metal or has lath processing performed thereon (patent document 1), the power collection material having the metal foil having irregularities formed on its surface (patent document 2), and the power collection foil which has a plurality of holes penetrating therethrough, in which the peripheries of the holes project from at least one surface of the foil-like power collection material, and the thickness of the foil-like power collection material including the projected part formed on the periphery of the hole is more than 3% and not more than 25% of the total thickness of one polar plate which is the sum of the thickness of the mixed agent layer and that of the power collection material of the negative electrode or the positive electrode (patent document 3).

But the above-described proposed power collection foil which is reticulate, consists of the hole-formed punching metal or has lath processing performed thereon has a lower strength than that which the normal electrode power collection material should have. The method of forming the irregularities on the foil is not different from a contact method for an ordinary flat foil used as a technique for preventing the peeling of an active substance. Therefore when a battery is repeatingly charged and discharged at high current, the active substance of the positive and that of the negative electrodes expand and contract and peel and drop from the power collection foil. Thereby a short circuit is induced, which may result in the generation of heat. In addition these methods cause metal powder of the power collection foil generated in processing it to slip into the battery, thus causing a problem of the occurrence of the short circuit.

As a production method for producing electrodes for the lithium secondary battery, there is disclosed the apparatus for successively producing the paste type electrode plates while the apparatus is successively measuring the weight of paste without contact between the apparatus and paste (patent document 4).

There is disclosed the production method for producing the electrode for the lithium secondary battery having the first step of forming the active substance film which absorbs and discharges lithium on the power collection foil by using a vacuum process and the second step of removing the projections formed on the surface of the film of the active substance by the blade having the straight edge. In the second step, the projections are removed by moving the film of the active substance with the straight edge of the blade being spaced at the predetermined interval from the surface of the active substance film (patent document 5).

But the apparatus has a problem that in winding the power collection foil in a roll shape through which a plurality of the holes penetrating the power collection foil is formed, metal powder generated while the foil is being processed remains on the surface thereof and slips into the mixed agent layer in forming the mixed agent layer on the power collection foil thereafter.

PRIOR ART DOCUMENT

Patent Document

Patent document 1: Japanese Patent Application Laid-Open No. H11-260375
Patent document 2: Japanese Patent Application Laid-Open No. 2004-342519
Patent document 3: Japanese Patent Application Laid-Open No. 2008-311171
Patent document 4: Japanese Patent Application Laid-Open No. H08-96806
Patent document 5: Japanese Patent Application Laid-Open No. 2008-4281

SUMMARY OF THE INVENTION

Problem to be Solved by the Invention

The present invention has been made to cope with the above-described problems. It is an object of the present invention to provide a lithium secondary battery in which peeling of an active substance can be prevented and the generation of metal powder can be prevented when a power collection foil is processed at an electrode production step, a method of producing the power collection foil for the lithium secondary battery, and the power collection foil for the lithium secondary battery to be produced by performing the production method.

Means for Solving the Problem

The method of the present invention for producing a lithium secondary battery includes an electrode-producing step of producing a positive electrode and a negative electrode; a step of forming a group of electrodes by layering the positive electrode and the negative electrode on each other through a separator, or winding the positive electrode and the negative electrode through a separator; and a step of immersing the group of the electrodes in an electrolyte. The electrode-producing step has a boring step of forming a plurality of through-holes penetrating a power collection foil and having projected parts projected from at least a rear surface of the power collection foil and a mixed agent-forming step of forming a mixed agent layer on the power collection foil. After the boring step finishes, the mixed agent-forming step is successively performed without winding the power collection foil through which the through-holes have been formed.

In the boring step, the through-holes are formed by breaking through the power collection foil.

The present invention also provides a method for producing the power collection foil for the lithium secondary battery having the characteristics as described below and the power collection foil for the lithium secondary battery which is to be produced by performing the production method and has the characteristics as described below.

Effect of the Invention

In the method of the present invention for producing the lithium secondary battery, after the boring step finishes, the mixed agent layer is successively formed without winding the power collection foil through which the through-holes have been formed. Therefore the projected parts are not broken after the holes are formed, although the projected parts are liable to be broken when the power collection foil is wound round a roller after the boring step finishes. Consequently metal powder is not generated in processing the power collection foil.

The lithium secondary battery to be obtained by carrying out the production method of the present invention has a plurality of the holes penetrating the foil-like positive and negative electrode power collection materials serving as battery construction members. The peripheries of the holes are projected from at least one surface of the foil-like power collection material. The projected parts formed on the peripheries of the holes produce an anchoring effect for the layer of the mixed agent containing the active substance, thus improving the performance of holding the layer of the mixed agent containing the active substance formed on the surface of the power collection material. Thereby it is possible to prevent peeling of the mixed agent layer from the power collection material and accommodate a large amount of the active substance in the battery.

After processing the foil-like positive or negative electrode power collection material to form the projected parts on the peripheries of a plurality of the holes penetrating therethrough, it is possible to successively process the foil and form the mixed agent layer containing the active substance on the foil without winding the power collection material and without contact between the projected parts and transport equipment when the foil is transported. In addition the power collection foil is processed to bend the distal end portion of each projected part thereof inward or outward with respect to the corresponding hole. In the lithium secondary battery to be obtained by the production method of the present invention for producing the electrode of the lithium secondary battery, even though the foil-like positive or negative electrode mixed agent layer expands and contracts while the battery is being charged and discharged, adhesion among particles and among the positive or negative electrode mixed agent layer and the power collection material are maintained, and metal powder is not generated during the processing of the foil. Therefore an internal short circuit does not occur and thus the safety of the lithium secondary battery can be improved over the conventional lithium secondary battery. Because the distal end portions of the projected parts formed on the peripheries of the holes are bent inward or outward, the projected parts have improved active substance-holding performance. The distal end portions of the projected parts are round. Thus if the distal end portions of the projected parts formed on the peripheries of the holes project outside the electrode, it does not occur that the projected parts pierce a separator and cause an internal short circuit to occur between the electrode and the opposite electrode.

MODE FOR CARRYING OUT THE INVENTION

Figure 1:
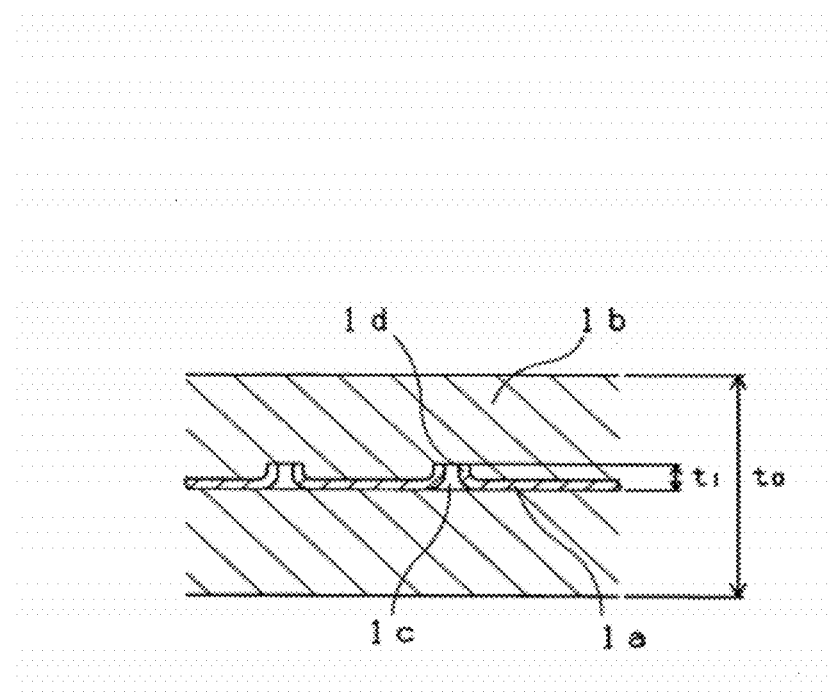
FIG. 1 is a sectional view showing an example of a positive electrode plate or a negative electrode plate.
Figure 2:
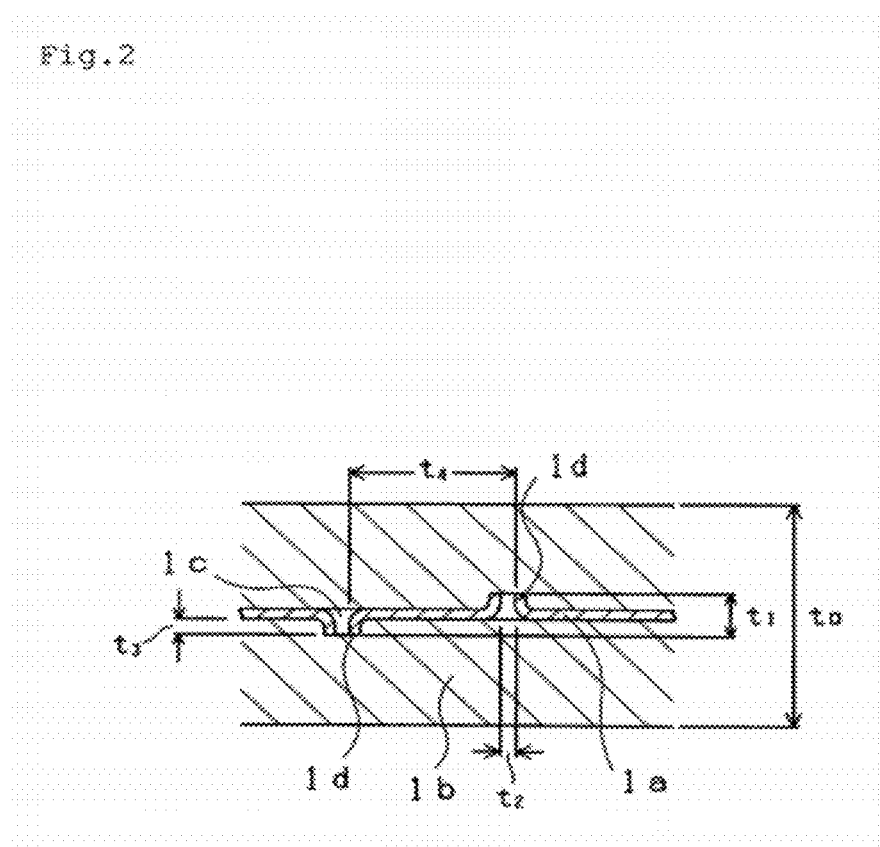
FIG. 2 is a sectional view showing an example of another positive electrode plate or negative electrode plate.
Figure 3:
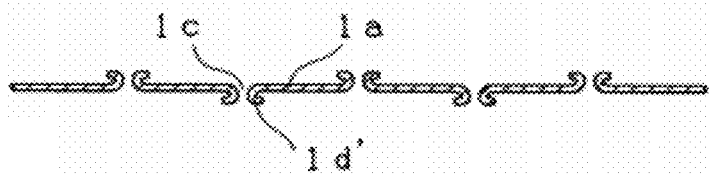
FIG. 3 is an end view in which the configuration of a distal end of a hole of a polar plate is bent outward.

An example of a positive or negative electrode power collection foil serving as a power collection material for a lithium secondary battery to be obtained by performing the production method of the present invention is described below. FIGS. 1 and 2 are sectional views showing an example of a positive or negative electrode plate. FIG. 3 is an end view showing the configuration of outward bent distal ends of holes of the polar plate.

An active substance layer which forms a negative electrode mixed agent layer of the negative electrode for the lithium secondary battery can be formed by kneading a main material containing a material capable of absorbing and discharging lithium ions, a binding agent, and a dispersing solvent to paste a kneaded mixture and thereafter applying the obtained pasty kneaded mixture to both surfaces of a foil-like power collection material $1a$.

As the material capable of absorbing and discharging the lithium ions, it is possible to list a carbon material, a lithium-aluminum alloy, a silicone-based lithium alloy, and a tin-based lithium alloy. Of these materials, it is preferable to use the carbon material for the reason that it absorbs and discharges a large amount of the lithium ions and has a small irreversible capacity. As the power collection material $1a$ which can be used in the present invention, an aluminum foil is used for the positive electrode and a copper foil is used for the negative electrode in view of their electrochemical properties, processabilities into the foil-like configuration, and costs.

An active substance which forms a positive electrode mixed agent layer of the positive electrode for the lithium secondary battery can be formed by kneading a main material containing a lithium-containing metal oxide, a lithium-containing metal phosphate compound or a lithium-containing compound, the binding agent, and the dispersing solvent to paste an obtained kneaded mixture and thereafter applying the pasty mixture to both surfaces of the foil-shaped power collection material $1a$.

As the lithium-containing metal oxide, $LiCoO_2$, Li (Ni/Co/Mn) $O_2$, and $LiMn_2O_4$ are listed. As the lithium-containing metal phosphate compound, $LiFePO_4$, $LiCoPo_4$, and $LiMnPO_4$ are listed. As the lithium-containing compound, $LiTi_2 (PO_4)_3$, $LiFeO_2$ are listed. Of these compounds, it is preferable to use $LiCoO_2$, Li (Ni/Co/Mn) $O_2$, $LiMn_2O_4$ and $LiFePO_4$ in view of their electrochemical properties, safety, and costs.

FIGS. 1 and 2 are sectional views of one positive or negative electrode plate composed of the mixed agent layer and the foil-like power collection material having a plurality of through-holes each having a projected part.

Supposing that the thickness of the power collection material $1a$ including a projected part $1d$ thereof formed on the periphery of a projected hole (through-hole) $1c$ is $t_1$, the ratio of a total thickness $t_0$ of one polar plate to the value obtained by subtracting the thickness $t_1$ from the total thickness $t_0$ of the polar plate which is the sum of the thickness of the power collection material $1a$ and that of the mixed agent layer $1b$ is favorably not less than 3% and more favorably not less than 10% nor more than 50%.

In the case where the projected part $1d$ formed on the periphery of the hole is formed through the power collection material $1a$ projects from only one surface of the power collection material $1a$, the thickness $t_1$ of the power collection material $1a$ is the height from an unprojected surface of the hole $1c$ to the distal end of the projected part $1d$ (FIG. 1). In the case where the projected part $1d$ formed on the periphery of the hole $1c$ project from both surfaces of the power collection material $1a$, the thickness $t_1$ of the power collection material $1a$ is the height from the distal end of the projected part $1d$ projected from one surface of the power collection material $1a$ to the distal end of the projected part $1d$ projected from the opposite surface thereof (FIG. 2). The projected parts and the holes may be formed entirely on the surface of the power collection material or may be formed partly on the surface thereof except the flat foil-like portion of the unprojected surface of the power collection material $1a$. It is more favorable to partly form the projected parts and the holes on the surface of the power collection foil $1a$ in consideration of the strength thereof in producing the battery. It is preferable to form the projected holes at neither of side parts of the power collection foil and leave the flat foil-like portion there. In the production method of the present invention, the flat foil-like portions at both side parts of the power collection foil are sandwiched between transport rollers without contact between the distal end portions of the projected holes and the transport rollers.

To prevent a short circuit from occurring inside the battery, as shown in FIG. 3, it is preferable to curvedly bend a distal end $1d'$ of the projected hole $1c$. The direction in which the distal end $1d'$ is bent may be outward or inward with respect to the corresponding hole, but it is favorable to bend the distal end $1d'$ outward to hold the active substance at a high force.

It is possible to use the power collection foil whose projected hole has any of a polyangular pyramidal configuration, a columnar configuration, a conic configuration, and configurations formed in combination of these configurations in the cross section thereof. The conic configuration is more favorable than the other configurations because the conic configuration allows processing to be performed at a high speed, a processing shot life of a processing jig to be long, and there is a low possibility that cut powder and peeled powder is generated to a low extent after the power collection foil is processed at the distal end portions of the projected holes.

It is preferable to form the projected hole of the power collection foil as the through-hole by breaking through the power collection foil because the projected hole improves the power collection effect. The through-hole formed by breaking through the power collection foil is superior to a through-hole formed through the power collection foil by punching processing and to irregularities formed thereon by emboss processing in the performance of charging and discharging the lithium secondary battery at high current when the power collection foil is used therefor and in durability because the former through-hole prevents the occurrence of an internal short circuit at a cycle time.

FIG. 2 shows a plurality of through-holes formed by breaking through the power collection foil. Diameters $t_2$ of the through-holes are 50 to 150 µm. Heights $t_3$ of the projected parts are 50 to 400 µm. A distance $t_4$ between the adjacent through-holes is 300 to 2000 µm.

By setting the specifications of the through-holes to the above-described range, the entire through-hole-formed surface receives a surface pressure. Thus when the power collection foil is wound round a winding roll with the winding roll in direct contact with the through-hole-formed surface, the through-holes are not occluded.

A separator usable for the lithium secondary battery electrically insulates the positive and negative electrodes from each other and holds an electrolyte. It is possible to list synthetic resins and inorganic fibers as the material of the separator. As examples of the material of the separator, it is possible to list a polyethylene film and a polypropylene film.

As the electrolyte of the lithium secondary battery in which the above-described group of the electrodes is immersed, it is preferable to use a non-aqueous electrolyte containing lithium salts or an ion-conducting polymer.

As a non-aqueous solvent of the non-aqueous electrolyte containing the lithium salts, ethylene carbonate (EC), propylene carbonate (PC), diethyl carbonate (DEC), dimethyl carbonate (DMC), and methyl ethyl carbonate (MEC) are listed.

As the lithium salts which can be dissolved in the non-aqueous solvent, lithium hexafluorophosphate ($LiPF_6$), lithium tetrafluoroborate ($LiBF_4$), and lithium trifluoromethanesulfonate ($LiSO_3CF_4$) are listed.

Figure 4:
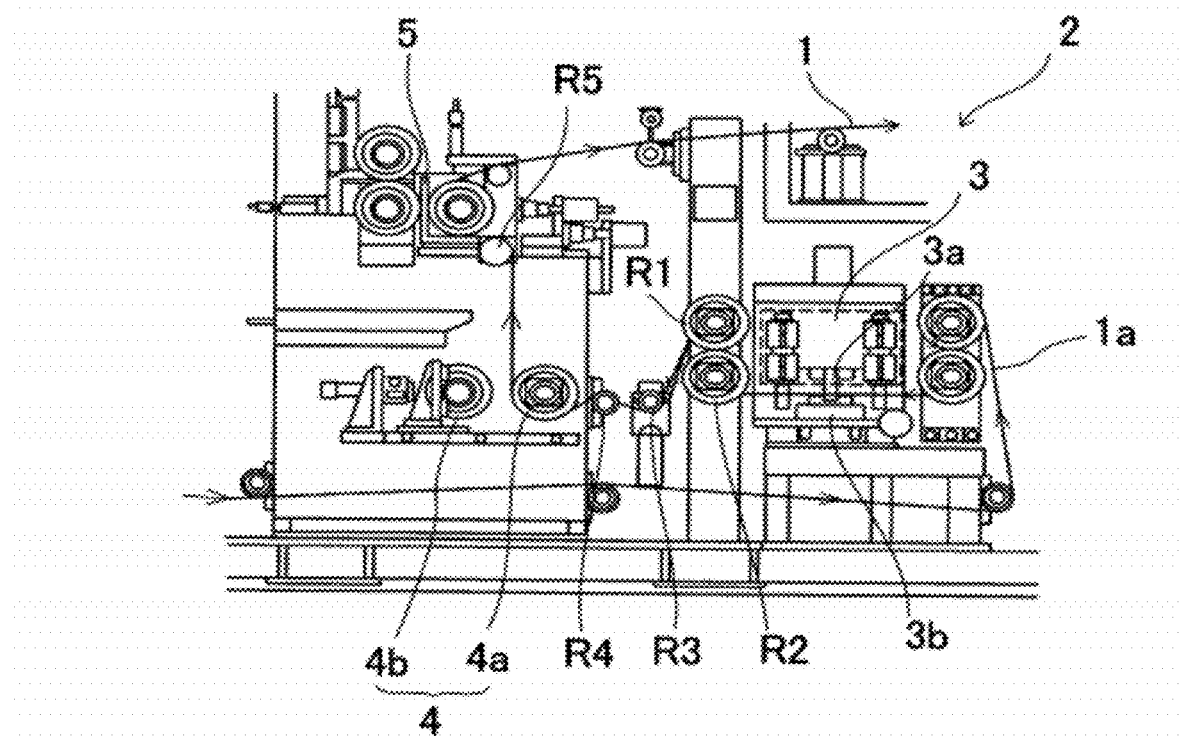
FIG. 4 shows a power collection foil-processing device for forming continuous projected parts and a mixed agent layer-forming device.

FIG. 4 shows the outline of an electrode production apparatus, to be used in production steps, in which a power collection foil processing device and a mixed agent layer formation device are successively arranged.

In the electrode production apparatus 2, a power collection foil processing device 3, a press roll device 4 for bending the distal end portion of the projected part inward or outward with respect to the corresponding hole after the processing of the power collection foil $1a$ finishes, and a coating device 5 for successively forming the mixed agent layer after the processing of the power collection foil $1a$ finishes are successively arranged in the order from the power collection foil processing device 3, the press roll device 4, and the coating device 5 along the production line of the power collection material 1 to be produced as the positive or negative electrode without winding the power collection foil $1a$ halfway. The press roll device 4 is equipped as necessary.

The power collection foil processing device 3 forms the projected holes $1c$ as the through-holes successively penetrating the power collection foil 1a. This device is a die constructed of punches 3a disposed perpendicularly to the upper and lower surfaces of the power collection foil 1a and dies 3b disposed below the lower surface of the power collection foil 1a or above the upper surface thereof and having concave portions.

Figure 6:
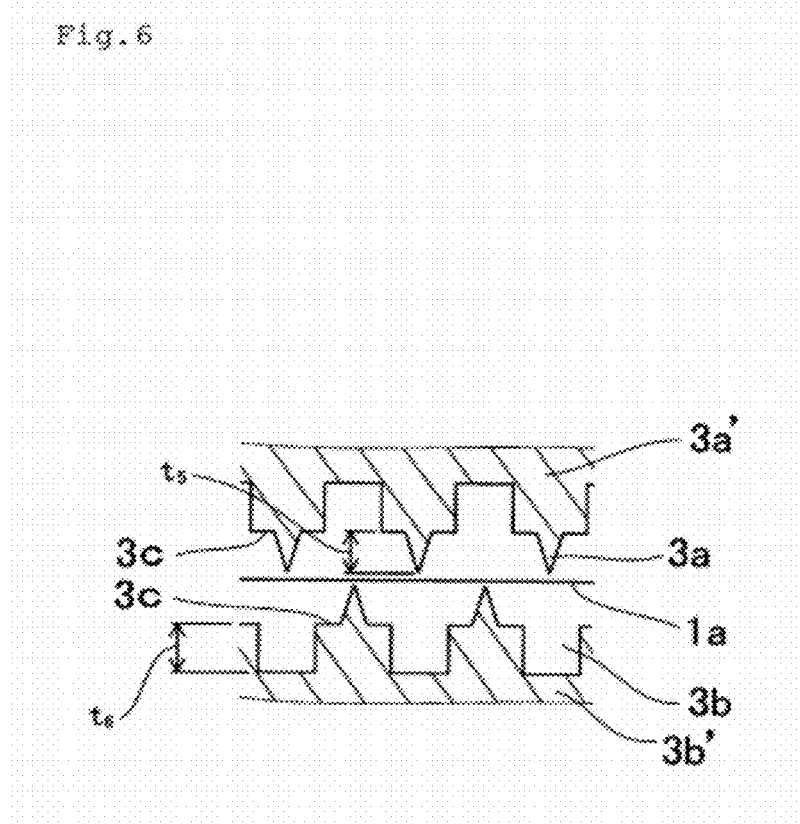
FIG. 6 is a sectional view of a die.

FIG. 6 shows a sectional surface of the die. The die is constructed of an upper die 3a' and a lower die 3b' where a plurality of punches 3a and dies 3b are arranged.

The punches 3a and the dies 3b are formed on die butting surfaces 3c of the upper die 3a' and the lower die 3b'. The dies 3b each having the concave portion having a depth $t_6$ longer than a vertical length $t_5$ of each of the projected punches 3a are formed on the butting surfaces 3c of the upper die 3a' and the lower die 3b'.

By successively and repeatingly butting the upper die 3a' and the lower die 3b' against each other and opening them, the punches 3a press the power collection foil 1a against the concave portions of the dies 3b. Thereby the projected holes 1c are formed through the power collection foil 1a. It is preferable to conically shape the distal end portions of the punches 3a.

The press roll device 4 bends the distal end portions of projected holes 1c inward or outward after the projected holes 1c are formed through the power collection foil 1a. The press roll device 4 is constructed of a roller 4a supporting the power collection foil 1a through which the projected holes 1c are formed and a press roller 4b capable of moving forward and backward with respect to the roller 4a. The press roller 4b is pressed against the power collection foil 1a disposed on the roller 4a. Thereby it is possible to bend the distal end portion of each of the projected holes 1c inward or outward with respect to the corresponding through-hole.

Figure 7:
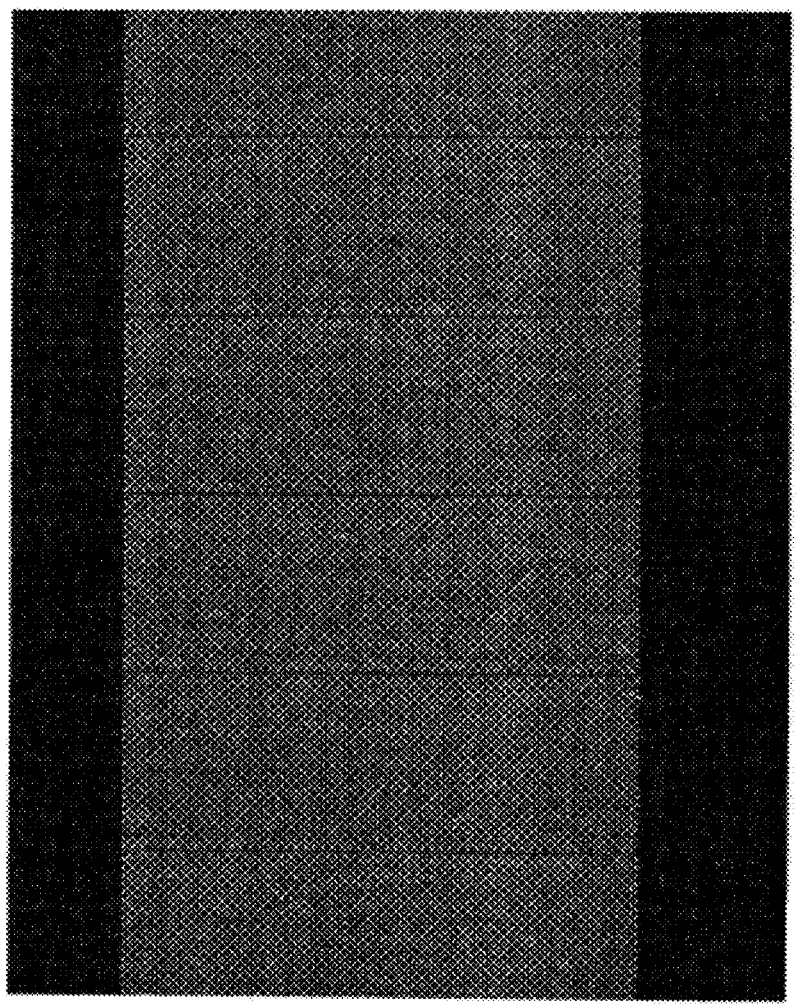
FIG. 7 is a plan view of a power collection foil for a lithium secondary battery.

By using the power collection foil processing device 3, it is possible to produce the power collection foil for the lithium secondary battery by winding the power collection foil without performing the mixed agent-forming step. In this case, a spacer is disposed between wound layers of the power collection foil. FIG. 7 shows a plan view of the obtained power collection foil for the lithium secondary battery. The longitudinal central part in FIG. 7 is a part of the power collection foil consisting of an aluminum foil where a plurality of through-holes is formed. In both side parts consisting of an aluminum foil in FIG. 7, through-holes are not formed.

The coating device 5 forms the positive or negative electrode mixed agent layer 1b on both-side surfaces of the power collection foil 1a through which the projected holes have been formed. As devices for forming the mixed agent layer 1b, a coating device for transferring paint consisting of the mixed agent to the power collection foil 1a by means of a roll coater or a die coater, a spray device for spraying the paint of the mixed agent, and an immersion device for immersing the power collection foil 1a in a paint solution are listed. Of these devices, the coating device and the immersion device capable of simultaneously forming the mixed agent layer 1b on both-side surfaces of the power collection foil 1 are preferable. A slit die coating device capable of simultaneously coating both-side surfaces of the power collection foil 1 is particularly preferable.

After the power collection foil 1a is coated with the mixed agent, the mixed agent is dried in a drying oven. As the drying oven, a vertical type or a horizontal type can be used.

In the production method of the present invention for producing the lithium secondary battery, by using the electrode production apparatus, the step of boring holes through the power collection foil successively supplied, the step of processing the power collection foil at the distal ends of the projected holes, and the step of forming the mixed agent layer are successively performed. By successively performing the above-described steps, the upper and lower surfaces of the power collection foil are prevented from contacting or rubbing each other in coiling and uncoiling the power collection foil. Therefore after the power collection foil 1a is processed, the cut powder and the peeled powder are not generated from the distal ends of the holes thereof.

After the power collection foil 1a undergoes the boring step, the power collection foil 1a is transported in contact with transport rolls R1 through R5. An intermittent transport generated in the boring step is returned to a successive transport by the rolls R3 and R4. Because the through-holes of the power collection foil 1a are densely formed, as described above, the entire through-hole-formed surface is subjected to a surface pressure. Thus even though the power collection foil 1a is wound round the winding roll with the winding roll in contact with the through-hole-formed surface, the through-holes are not occluded.

Figure 5:
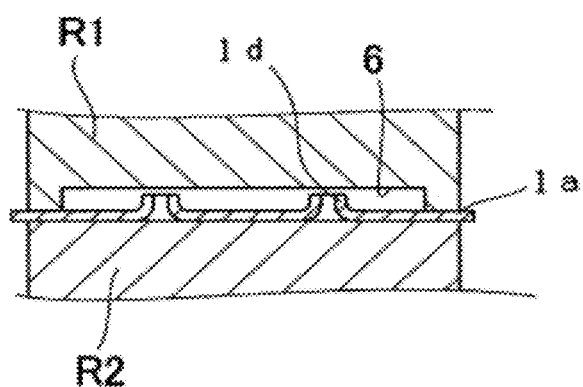
FIG. 5 is a sectional view of a transport roller.

It is possible to wind the power collection foil 1a round the winding roll without contact between the winding roll and the through-hole-formed surface. FIG. 5 is a sectional view of such a transport roll. To prevent the projected parts 1d formed by processing the power collection foil 1a at the distal end portions 1d of the projected holes 1c from contacting the surface of the foil transport roll R1, the foil transport roll R1 has an incision 6 formed therein. When the projected parts 1d formed by processing the power collection foil 1a at the distal end portions 1d of the projected holes 1c are present on both surfaces of the power collection foil 1a, the incision 6 is formed on both of the transport rolls R1 and R2.

In the method of the present invention for producing the lithium secondary battery, after the positive and negative electrodes are produced by carrying out the above-described method, it is possible to adopt known methods without limitation in carrying out the step of forming the group of electrodes by layering the positive and negative electrodes on each other through the separator, or winding the positive and negative electrodes through the separator and the step of immersing the group of the electrodes in the electrolyte.

Because the electrode to be produced by a continuous-type foil processing/mixed agent forming device of the present invention does not generate the cut powder and the peeled powder in processing the foil, it is possible to resolve the unsafety of the conventional lithium secondary battery caused by the internal short circuit.

EXAMPLES

Example 1

The positive electrode of the lithium secondary battery was produced by carrying out a method described below.

Eight parts by weight of a conductive agent composed of a mixture of conductive carbon and a conductive carbon fibrous material and eight parts by weight of a binder consisting of polyvinylidene fluoride were added to 84 parts by weight of a positive electrode active substance consisting of olivine-type lithium iron phosphate whose secondary particles had diameters of 2 to 3 µm. N-methylpyrrolidone was added to the obtained mixture as a dispersion solvent. Thereafter the above-described components were kneaded to produce a positive electrode mixed agent (positive electrode slurry).

An aluminum foil having a thickness of 20 μm and a width of 150 mm was prepared. The aluminum foil wound round a supply roll was supplied.

The aluminum foil pulled out of the supply roll underwent the processing of forming projected holes therethrough at the power collection foil-processing device 3 of the production apparatus shown in FIG. 4. The projected holes each having the height $t_1$ of 120 μm shown in FIG. 2 were formed. Thereafter without operating the press roll device 4, the aluminum foil having the projected holes formed therethrough was guided to the coating device 5. The positive electrode slurry was applied to both surfaces of the processed aluminum foil and dried. At the boring and coating steps, the aluminum foil was successively supplied from the supply roll. After the bore-forming step finishes, the aluminum foil was successively guided to the coating step without the aluminum foil being wound. Thereafter the aluminum foil was pressed and cut to obtain the positive electrode for the lithium secondary battery. When the aluminum foil was pressed after the positive electrode slurry was applied to both surfaces of the aluminum foil and dried, the total thickness $t_0$ of the positive electrode was 160 μm.

Example 2

The negative electrode of the lithium secondary battery was produced by a method described below.

Five parts by weight of the binder consisting of the polyvinylidene fluoride was added to 94 parts by weight of graphite powder and one part by weight of the conductive agent consisting of the mixture of the conductive carbon and the conductive carbon fibrous material. The N-methylpyrrolidone was added to the obtained mixture as the dispersion solvent. Thereafter the above-described components were kneaded to produce a negative electrode mixed agent (negative electrode slurry).

A copper foil having a thickness of 10 μm and a width of 150 mm was prepared. The copper foil wound round the supply roll was supplied.

The copper foil pulled out of the supply roll underwent the processing of forming projected holes therethrough at the power collection foil-processing device 3 of the production apparatus shown in FIG. 4. The projected holes each having the height $t_1$ of 90 μm shown in FIG. 2 were formed. Thereafter without operating the press roll device 4, the copper foil having the projected holes formed therethrough was guided to the coating device 5. The negative electrode slurry was applied to both surfaces of the processed copper foil and dried. At the boring and coating steps, the copper foil was successively supplied from the supply roll. After the bore-forming step finishes, the copper foil was successively guided to the coating step without the copper foil being wound. Thereafter the copper foil was pressed and cut to obtain the negative electrode for the lithium secondary battery. When the copper foil was pressed after the negative electrode slurry was applied to both surfaces of the copper foil and dried, the total thickness $t_0$ of the negative electrode was 120 μm.

Example 3

By using the produced positive and negative electrode plates, an aluminum laminate film packing type lithium-ion battery of 4V-10 Ah was produced. As an electrolyte, a solution containing 1 mol/l of lithium hexafluorophosphate ($LiPF_6$) ($LiPF_6$) dissolved in a solution containing EC and MEC mixed with each other at 30:70 in a volume ratio was used. A woven cloth, made of PP resin fiber, which had a thickness of 40 μm was used as an insulator for separating the positive and negative electrodes from each other.

The obtained lithium ion battery was excellently charged and discharged at high current and thus excellent in its durability and safe.

Example 4

In the production method of the example 1, after the aluminum foil underwent the processing of forming projected holes therethrough, the press roll device 4 was operated to press a press roller 4b against the aluminum foil placed on the roller 4a. Thereby the distal end portions of the projected holes were bent inward or outward with respect to the through-holes. The heights $t_1$ of the projections of the foil, shown in FIG. 2, which were formed by processing the aluminum foil were 150 μm. Except the above-described method, the same method as that of the example 1 was carried out. A positive electrode having a total thickness $t_0$ of 180 μm was obtained.

Example 5

In the production method of the example 2, after the copper foil underwent the processing of forming projected holes therethrough, the press roll device 4 was operated to press the press roller 4b against the copper foil placed on the roller 4a. Thereby the distal end portion of each projected hole was bent inward or outward with respect to the through-hole. The heights $t_1$ of the projections of the foil, shown in FIG. 2, which were formed by processing the copper foil were 120 μm. Except the above-described method, the same method as that of the example 1 was carried out. A negative electrode having a total thickness $t_0$ of 140 μm was obtained.

Example 6

By using the produced positive and negative electrode plates, an aluminum laminate film packing type lithium-ion battery of 3.4V-10 Ah was produced. As an electrolyte, a solution containing 1 mol/l of lithium hexafluorophosphate ($LiPF_6$) dissolved in a solution containing EC and MEC mixed with each other at 30:70 in a volume ratio was used. A woven cloth, made of PP resin fiber, which had a thickness of 40 μm was used as an insulator for separating the positive and negative electrodes from each other.

The obtained lithium ion battery was more excellently charged and discharged at high current than the battery of the example 3 and thus excellent in its durability and safe.

Comparative Example 1

In the production methods of the examples 1 and 2, after the foils underwent the processing of forming projected holes therethrough, the power collection foils were wound round rolls respectively. Thereafter by using rolls where the power collection foils were wound as foil supply rolls, positive and negative electrode plates were produced by carrying out the same method as those of the examples 1 and 2.

A lithium-ion battery was obtained by carrying out the same method as that of the example 3.

The obtained lithium ion battery was excellently charged and discharged at high current in the early stage but an internal short circuit occurred at a cycle time and thus inferior in its durability and safety.

INDUSTRIAL APPLICABILITY

The method of the present invention for producing the lithium secondary battery which has a high capacity and can be repeatingly charged and discharged at high current does not generate an unsafe phenomenon such as a short circuit. Therefore the production method of the present invention can be applied to produce the lithium secondary battery which is used for many purposes in the future.

EXPLANATION OF REFERENCE SYMBOLS AND NUMERALS

1: positive or negative electrode
1*a*: positive or negative electrode power collection foil
1*b*: positive or negative mixed agent layer
1*d*: projected part
1*d'*: example of bent configuration of distal end portion of projected part
2: electrode production apparatus
3: foil processing device composed of die
4: press roll device
5: coating device
6: incision

The invention claimed is:

1. A method for producing a lithium secondary battery comprising:
an electrode-producing step of producing a positive electrode and a negative electrode;
a step of forming a group of electrodes by layering said positive electrode and said negative electrode on each other through a separator, or winding said positive electrode and said negative electrode through a separator; and
a step of immersing said group of said electrodes in an electrolyte,
wherein said electrode-producing step has a boring step of forming a plurality of through-holes that penetrate a power collection foil and form projected parts that project from at least a rear surface of said power collection foil and a mixed agent-forming step of forming a mixed agent layer on said power collection foil through which said plurality of through-holes have been formed;
wherein in said boring step of forming said plurality of through-holes, said through-holes are formed by breaking through said power collection foil;
wherein in said boring step of forming said plurality of through-holes, punches disposed perpendicularly to said power collection foil and dies having concave portions are butted successively and repeatedly against each other with said power collection foil being sandwiched between an upper die and a lower die by using a power collection foil processing device constructed of said punches formed on one butting surface of each of said upper die and said lower die and dies where concave portions each having a depth longer than a vertical length of each of said projected punches are formed on other butting surface of each of said upper die and said lower die; and
wherein after said bore-forming step finishes, said power collection foil is transported without contact between said projected parts and power collection foil transport equipment before said mixed-agent forming step is performed without said power collection foil being wound.

2. A method for producing a lithium secondary battery according to claim 1, wherein said through holes have a conic configuration and diameters of a plurality of said through-holes is 50 to 150 μm; heights of said projected parts are 50 to 400 μm; and a distance between adjacent through-holes is 300 to 2000 μm.

3. A method for producing a lithium secondary battery according to claim 1, wherein both side parts of said power collection foil in a width direction thereof are flat portions where a plurality of said through-holes is not formed.

4. A method for producing a lithium secondary battery according to claim 1, wherein said power collection foil is an aluminum foil or a copper foil.

5. A method for producing a lithium secondary battery according to claim 1, having a step of processing said power collection foil to bend a distal end of each of said projected parts inward or outward with respect to said through-hole after said bore-forming step finishes.

* * * * *